Dec. 29, 1959          A. BOTTI          2,918,808
SPEEDOMETER-ASSEMBLY CABLE
Filed July 22, 1955          3 Sheets-Sheet 1
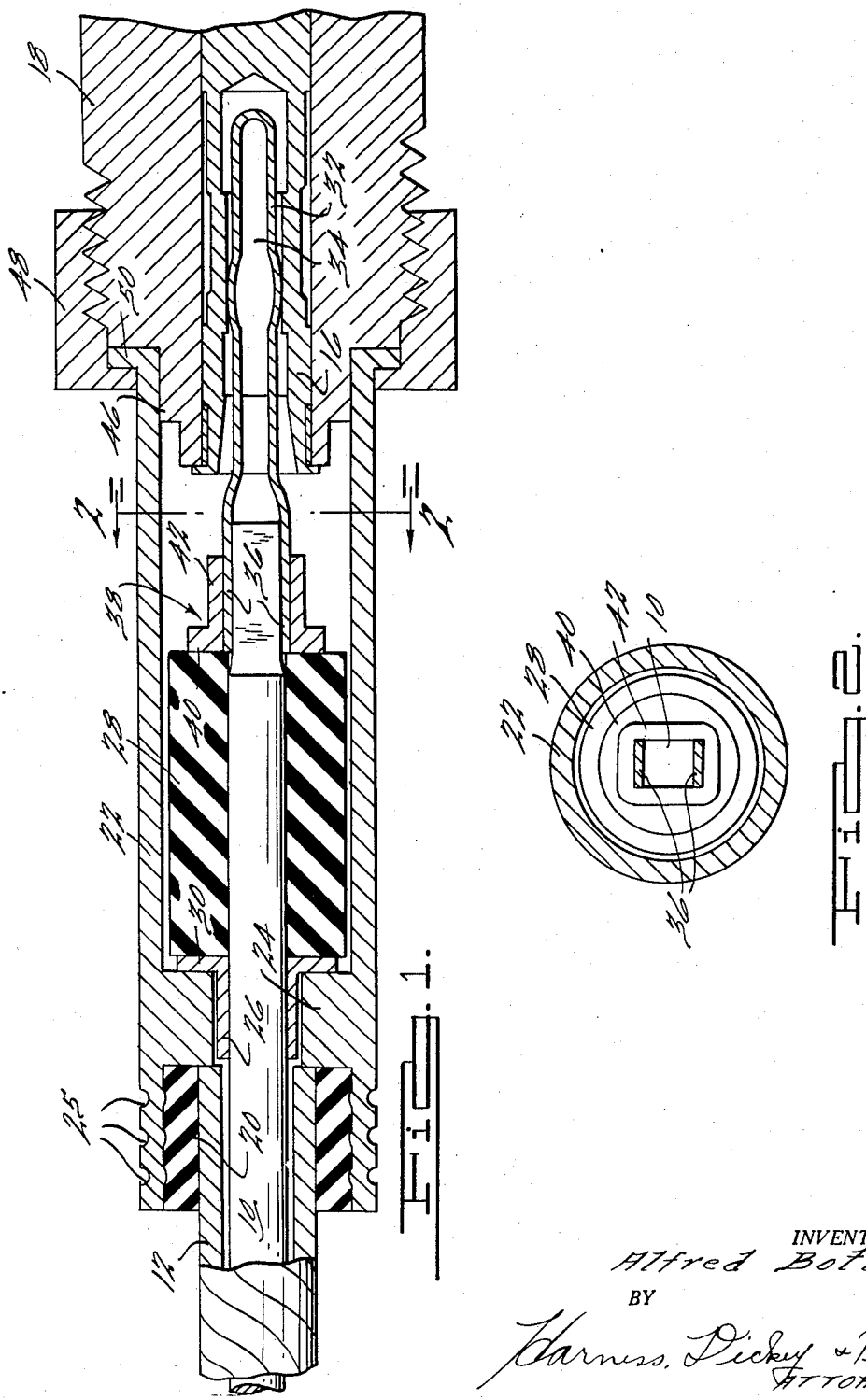
INVENTOR.
Alfred Botti
BY
Harness, Dickey & Pierce
ATTORNEYS

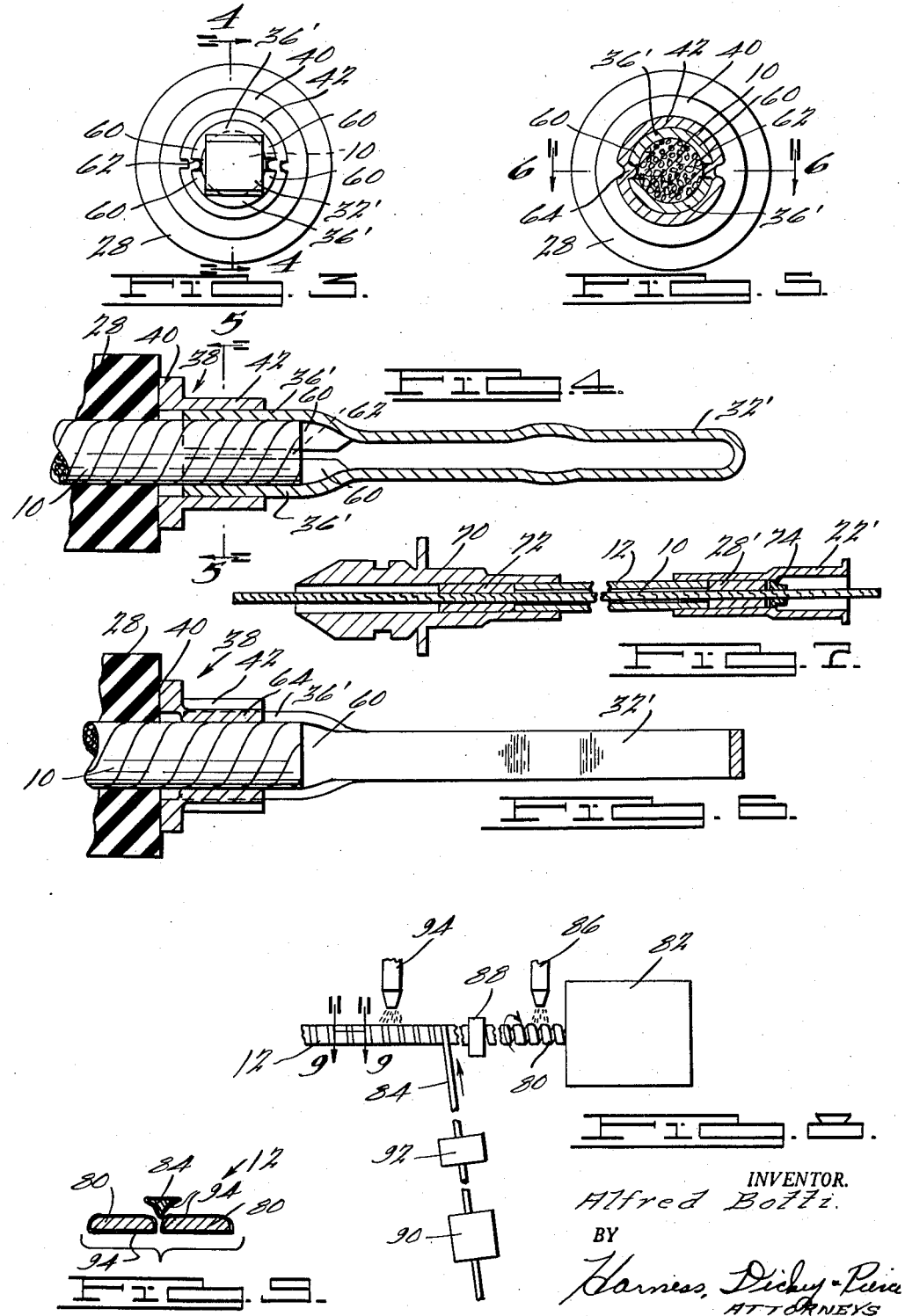

Dec. 29, 1959 A. BOTTI 2,918,808
SPEEDOMETER-ASSEMBLY CABLE
Filed July 22, 1955 3 Sheets-Sheet 3
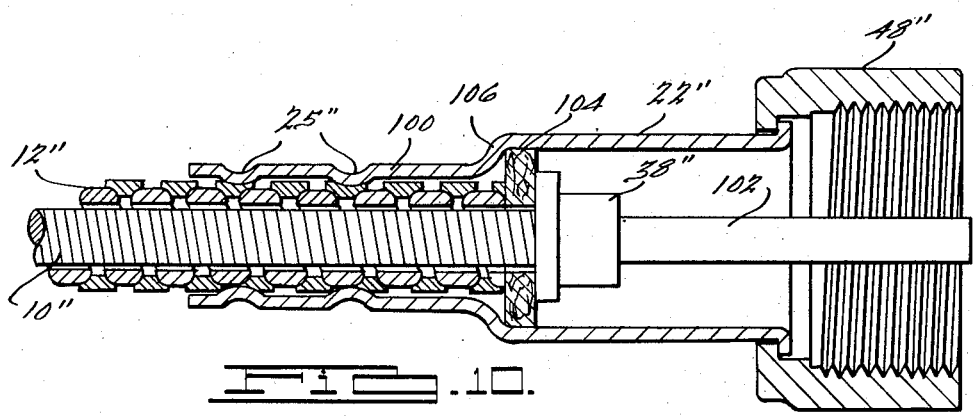
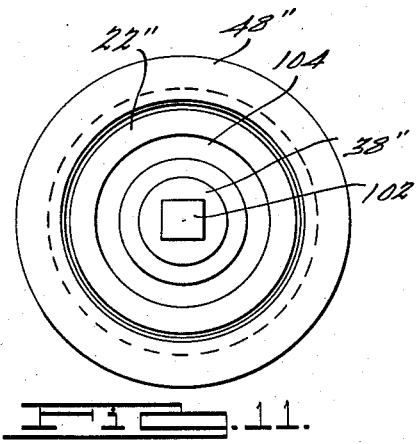
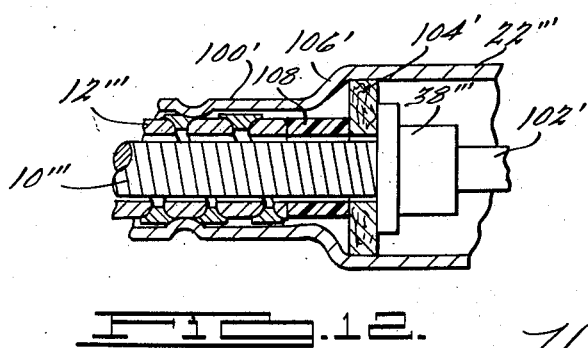
INVENTOR.
Alfred Botti.
BY
Harness, Dickey & Pierce
ATTORNEYS

United States Patent Office 2,918,808
Patented Dec. 29, 1959

2,918,808

SPEEDOMETER-ASSEMBLY CABLE

Alfred Botti, Detroit, Mich., assignor to C. M. Hall Lamp Co., Detroit, Mich., a corporation of Michigan Application July 22, 1955, Serial No. 523,735

22 Claims. (Cl. 64—4)

This invention relates to torque-transmitting cables and more particularly to cables for transmitting torque derived from the transmission train of an automobile to a speedometer assembly in that automobile.

This application is a continuation-in-part of my copending applications Serial No. 495,715, filed March 21, 1955, and Serial No. 509,176, filed May 18, 1955, bearing like title both now abandoned.

Encased cables interconnecting the transmission and the speedometer-odometer assembly of an automobile tend to transmit not only the desirable torque but also undesirable engine and transmission-train noises. Efforts have previously been made to interpose sound-absorbing materials between the cable and the speedometer assembly to provide the desirable acoustic damping, but it has been found that the prior practices have also impaired the torque transmitting capabilities and impeded the proper operation of the cable, and, in many cases, produced malfunctioning of the torque-transmitting apparatus.

In accordance with the principles of the present invention, effective attenuation of sound waves is achieved without impairing the torque transmitting capabilities of the unit. Thus, in one form of the invention the primary support for the cable and its casing is of a material having the capability of absorbing, dissipating and offering a high impedance to the transmission of audio-frequency energy, and yet the direct torque-transmitting train is all metallic and comprises parts integrally related one to the other so that proper torque transmission is positively accomplished. The volume of metallic, sound-transmitting material is small relative to the volume of sound-absorbing material, so that appropriate sound deadening is achieved.

Other forms of the invention are based upon the premise that the primary source of noise in the metal-to-metal engagement between the central cable or core, or parts integral therewith, and the attaching ferrule when the cable or core whips, during rotation, due to a lack of concentricity between the cable and the ferrule.

An object, therefore, of this invention is to transmit torque with minimum loss and to transmit sound energy with maximum loss.

Another object of this invention is to reduce the generation of noise in a speedometer cable assembly.

The manner of accomplishment of these and other objects of the invention will be perceived from the following detailed description of embodiments of the invention when read with reference to the accompanying drawings in which:

Figure 1 is a sectional view of a construction embodying the principles of the invention;

Fig. 2 is a sectional view taken substantially along the line 2—2 of Fig. 1;

Fig. 3 is an end elevational view of a modified form of the structure.

Fig. 4 is a sectional view taken substantially along the line 4—4 of Fig. 3;

Fig. 5 is a sectional view taken substantially along the line 5—5 of Fig. 4;

Fig. 6 is a sectional view taken substantially along the line 6—6 of Fig. 5;

Fig. 7 is a view of a complete cable assembly embodying a modified form of the principles of the invention;

Fig. 8 is a representation of an apparatus for selectively coating elements of the flexible casing with a sound absorbing material;

Fig. 9 is a sectional view taken substantially along the line 9—9 of Fig. 8, but with the parts separated for clarity of representation.

Fig. 10 is a sectional view of another form of the invention;

Fig. 11 is an end view of the structure of Fig. 10; and

Fig. 12 is a sectional view of a modified form of the arrangement of Fig. 10.

Referring now to Figs. 1 and 2 of those drawings, a cable or core 10 is rotatably mounted within a flexible casing 12. In accordance with the conventional practice, the casing 12 is rigidly and non-rotatably associated with an automobile's transmission housing (not shown), and the cable 10 passes through an aperture in that housing and is connected so as to be driven at a speed which is a function of the speed of rotation of the rear wheels of the automobile.

In order that the torsional forces applied to the cable 10 may be transmitted to the speedometer-odometer assembly, the cable 10 is associated with a rotatable member 16 in that speedometer assembly and the casing 12 is connected to the speedometer assembly housing 18, as will be described.

The end of the casing 12 makes a press-fit engagement with the bore of a tubular insulating bushing 20. It has been found that Buna-N rubber is an appropriate material for the bushing 20. Bushing 20 is retained within ferrule 22 and in abutment with flange 24 therein by means of appropriate deformation of the ferrule 22, as by crimping as shown at 25.

The cable 10 extends beyond the end of the casing 12 and passes through an aperture in the flange 24. Cable 10 is held out of engagement with the flange 24 and is held centered therein by means of a sleeve bearing 26. Bearing 26, which is preferably constructed of a plastic material having good wearing but poor sound transmitting characteristics, has an outer diameter which is equal to or slightly less than the diameter of the aperture in the flange 24 so as to be freely rotatable therewithin, but the internal diameter of the bearing 26 is selected to provide a non-rotative engagement with the cable 10. While, as shown and preferred, the bearing 26 is adapted to rotate with the cable 10 relative to the flange 24 and the casing 12, the dimensions may be changed so that the cable 10 rotates relative to the bearing 26, with the bearing 26 being non-rotatively inserted within the aperture in the flange 24.

Bearing 26 is provided with a shoulder 30 normally engaging the front face of the flange 24 for a purpose hereinafter to be described.

A circular cylindrical tubular sleeve 28 is pressed upon the cable 10 so as to be non-rotatable with respect thereto. Sleeve 28 is preferably of a resilient material such as rubber, and its outer diameter is such that it may slide freely into the ferrule 22 and be freely rotatable with respect there to. Sleeve 28 therefore serves or may serve as a bearing and maintains the cable 10 accurately centered in the ferrule 22. Shoulder 30 on sleeve bearing 26 is interposed the sleeve 28 and the flange 24 of the ferrule 22 to serve as a thrust bearing and to reduce the wear of the sleeve 28.

The torque applied to the cable 10 is applied through a spring clip 32. Clip 32 is a folded strip of metal having two legs 36 extending rearwardly and in spaced parallelism one with the other. The forwardmost end of the cable 10 is squeezed, pressed or otherwise formed so as to have opposing flat faces. These faces are engaged by the legs 36 of the spring clip 32. The maintenance of this relationship is ensured by staking the clip 32 to the cable 10. The relationship is further ensured by a tubular collar 38 which is provided with a flange portion 40 abutting the sleeve 28 and a body portion 42 which overlies the rear ends of the legs 36 and which is preferably swaged thereto. The resultant deformation of the body portion 42 may best be seen in Fig. 2. Thus, the spring clip 32 is firmly, rigidly and non-rotatably associated with the cable 10.

The cable assembly is associated with the speedometer assembly in the normal fashion, with the spring clip 32 engaging the socket 34 of the driving member 16, with the forwardmost end of the ferrule 22 overlying a shoulder portion 46 of the speedometer assembly housing 18, and with the parts being retained in position by a collar 48 engaging a flange 50 on the ferrule 22 and threadedly engaging the housing 18 of the speedometer assembly.

By virtue of this construction, the speedometer cable casing 12 is securely and non-rotatably retained with respect to the ferrule 22 and hence with respect to the speedometer assembly but is resiliently mounted so that a high impedance is offered to sound waves travelling up the casing. Further, the suport bearings for the cable 10 with respect to the ferrule 22 are of rubber or other resilient material so that the transmission of noise from the cable 10 to the ferrule 22 and hence to the cab of the automobile is impeded. Therefore, despite the establishment of a positive torque transmitting train between the automobile's transmission and the automobile's speedometer assembly, sound waves conducted up the cable 10 and casing 12 are highly attenuated.

In the described arrangement, the forward end of the core 10 is formed, during or before assembly, into a square or rectangular shape so as to have two opposing flat faces engageable by the parallel inner faces of the rear ends of the legs 36 of the spring clip 32. Care must be exercised in that forming operation to insure that the square or rectangular end of the cable 10 remains coaxial with the remainder of the cable, for even a relatively small amount of eccentricity will produce sufficient whip of the spring clip 32 to generate a substantial amount of noise. With proper care, concentricity may be maintained during commercial production even though the cable is normally of stranded spring steel. However, under the alternative arrangement represented in Figs. 3 to 6 of the drawings, no such forming of the cable 10 is required, the cable remains round, and the difficulties of maintaining concentricity are thereby obviated.

As may best be seen in Figs. 3 and 4 of the drawings, the spring clip 32' is substantially identical to spring clip 32, as shown in Figs. 1 and 2 of the drawings, except that each of the legs 36' thereof is provided with a pair of laterally extending flanges 60. The legs 36' and the flanges 60 are bent into an annular form so as to define, at the rear of the spring clip 32', an essentially tubular portion having a pair, exemplarily, of diametrically opposed longitudinal slots 62. The diameter of the inner surface of this tubular portion of the spring clip 32 is substantially equal to the outer diameter of the forward end of the core 10 which it engages.

As in the previously described embodiment, a tubular collar 38 is provided to hold the spring clip 32' to the core 10. Contrary to the prior example, however, instead of the body portion 42 of the collar 38 being squeezed into a roughly rectangular form, its circular configuration is maintained except for a pair of longitudinal, diametrically opposed protuberances 64 (Figs. 5 and 6) formed on the inner surface thereof. Protuberances 64 are preferably formed by a swaging operation, as is evidenced by the depressions aligned therewith in the surface of the body portion 42 of the tubular collar 38.

In the formation of the protuberances 64, the collar metal is forced into the longitudinal slots 62 between the flanges 60 of the spring clip 32' and into tight abutment with the surface of the core 10. The protuberances 64 may, if desired, be actually embedded in the surface of the core 10 since this deformation of the core 10 need not produce any resultant eccentricity, particularly if the two protuberances are concurrently formed.

In this manner, the spring clip 32' is rigidly secured to the core 10 without either the clip 32' or the core 10 becoming unduly distorted in the process. Concentricity is therefore readily maintained, thereby reducing the possibility of noise generation due to whipping of the clip 32'. However, this method of interattaching the clip and core may be employed in conjunction with the other sound damping elements disclosed in Figs. 1 and 2 of the drawings, if desired.

In the arrangement of Figs. 1 and 2 of the drawings, the sleeve 28 is preferably formed of a resilient, sound-absorbing material, as indicated. It is also preferred, in the arrangement of Figs. 1 and 2, that the sleeve 28 be non-rotatively associated with the core 10 but rotatable with respect to the ferrule 22. As an alternative arrangement, the sleeve 28 may be made of a harder, bearing material, such as nylon, tightly fitted within the ferrule 22 and rotatably engaging the core 10. This arrangement is represented in Fig. 7 of the drawings, in which a simplified form of speed-head ferrule 22' is employed, with the casing 12 being inserted in and connected to the rear end thereof. The sleeve 28' is also housed within the ferrule 22' in abutment with the end of the casing 12, with the external diameter of the sleeve 28' being so selected in the light of the internal diameter of the ferrule 22' that a tight and non-rotative fit is established therebetween. The core 10 preferably has a "running fit" with the central bore of the sleeve 28', i.e. the core 10 is guided in its rotational motion throughout its length of contact with the sleeve 28', but there is no binding between the parts impeding the rotation of the core 10. By virtue of this relationship between the sleeve 28' and the core 10, the axis of rotation of the core 10 is fixed within very close limits over this portion of the core's length.

Collar 74, swaged or otherwise affixed to the core 10, serves as a limit stop to the longitudinal motion of the core 10 relative to the casing 12 and may serve, in essence, as an end thrust bearing.

A corresponding arrangement may be established at the end of the cable which engages elements in the automobile's transmission. Thus, the core 10 may have a running fit engagement with a sleeve 72 fixed within the transmission ferrule 70, the casing 12 again being affixed directly to the ferrule. In the disclosed simplified arrangement, no counterparts of the spring clips 32 or 32' are employed, the ends of the cable 10 being merely squared or provided with flats in the conventional fashion.

There may be and normally is a substantial disparity between the external diameter of the core 10 and the internal diameter of the casing 12, so that the core 10 may tend, in rotating, to whip within the casing 12 and within the ferrules so as to produce a substantial noise. By virtue of the described arrangement, the axis of rotation of the core 10 is precisely fixed over portions of its length near each of its ends so that any whipping action which occurs intermediate those supported points will not be effectively transmitted to the extreme end portions of the core so as to create vibration and noise. Hence, so far as the motion of the end portions of the cable 10 is concerned, it is as though the entire cable were supported with a running fit throughout its length.

As an alternative or additional means for reducing the noise created or transmitted by the speedometer cable assembly, it is contemplated that one or both of the constituent wires of the casing assembly 12, or the entire casing assembly 12, be coated, on its interior or exterior surface or both, with a suitable sound-damping material such as a vinyl plastic. An exemplary method for applying such a coating is schematically represented in Fig. 8 of the drawings.

The so-called D wire 80 is formed in a helix in the normal fashion by a machine represented by the rectangle 82, with the formed wire being rotated as it emanates from that machine. The so-called A wire 84 is laid into the interstices between the turns of the D wire 80 in the manner well known in the art. As the D wire 80 leaves the forming machine 82, it may be dipped or sprayed with a vinyl plastic material, as by a nozzle 86. The adjacent turns of the wire 80 are adequately spaced so that the spray mist may become deposited upon the inner surfaces of the D wire 80 if desired, or the nozzle 86 may be so designed, positioned and directed, that only the exterior surfaces of the D wire 80 are coated. The D wire then passes through a drying apparatus 88 of any appropriate form. Additionally or alternatively, the A wire 84 may, prior to its assembly with the D wire 80, be sprayed with vinyl coating or passed through a dip bath represented at 90, and dried by apparatus 92. Again, the A wire 84 may be dipped or sprayed to cover its entire surface, or may be selectively sprayed from the upper or under sides so as to coat only the inner or outer surface of the A wire 84 with plastic material. Alternatively, if it is desired to coat only the exterior of the casing 12, the assembled casing may be passed through an appropriate dip bath or sprayed by a nozzle 94 and subsequently dried.

The view of Fig. 9 is an exploded sectional view of the resulting casing 12 if all surfaces of both the D wire 80 and the A wire 84 have been coated with a plastic material 94.

The term vinyl plastic is used generically and representatively, the particular material being applied, and the decision as to which of the several surfaces of the A and D wires 84 and 80 are to be covered, being based upon the abrasive action of the core, and the effects of such abrasion on the coating material.

In the arrangements of Figs. 10 and 11 of the drawings, the ferrule 22″ is provided with a reduced-diameter rear portion 100 which is firmly secured over the casing 12″ by appropriate means such as crimping 25″. The cable 10″ extends coaxially with the casing 12″ and the ferrule 22″ and is provided with a forward end portion 102 which has been pressed or otherwise formed to a generally square cross-section. This squared end 102 is adapted to engage an appropriately shaped recess in a speedometer assembly, as is well known in the art. As was the case in the arrangement of Fig. 1, the ferrule 22″ is adapted to be secured to the speedometer assembly by means of a collar or sleeve 48″.

A collar 38′, normally of brass or other metallic material, is firmly secured to the cable 10″ in any suitable fashion such as by staking. If desired, the collar 38″ may extend over a portion of the squared portion 102 to facilitate the establishment of a non-rotative relationship between the collar 38″ and the core 10″.

A cylindrical nonmetallic member 104 is seated within the ferrule 22″. It is preferable that member 104 establish a press fit with the internal diameter of the ferrule 22″ and to this end the outer diameter of the member 104 may actually be slightly greater than the internal diameter of the larger portion of the ferrule 22″. The member 104 may be pressed the length of the larger diameter portion of the ferrule 22″ and into engagement with the shoulder 106. While the casing 12″ is shown in abutment with the member 104, this is not essential to the operation of the device and other arrangements may be employed if desired.

In customary practice, the diameter of the cable 10″ is smaller than the diameter of the casing 12″ by a factor of some 10 to 20 thousandths of an inch. In the arrangement shown in Fig. 10, the internal diameter of the central aperture in the member 104, through which the cable 10″ passes, is shown to be approximately equal to the internal diameter of the casing 12″. In practice, the diameter of the aperture and the member 104 may be slightly smaller than the internal diameter of the core 12″ but not so small as to in any way inhibit the freedom of rotation of the cable 10″, and on the other hand the diameter of the aperture in the member 104 may be somewhat greater than the inner diameter of the casing 12″, such as by a factor of 10 to 20 thousandths of an inch.

The forward face of the member 104 normally serves as a bearing surface for the rear face of the collar 38″ and the inner surface of the member 104 at least occasionally serves as a bearing surface for the cable 10″ when the cable is employed in a vehicle, as will be noted. It has been found to be advantageous to make the member 104 of an appropriate non-metallic material such as a relatively rigid plastic, or, in a preferred arrangement, member 104 may be a fiber washer.

If the axis of the cable 10″ is purely rectilinear along the shown portion, and if the squared portion 102 is exactly concentric with the main circular portion of the cable 10″ then member 104 serves primarily as a thrust washer for the collar 38″. However, in practice, it has been found to be exceedingly difficult to maintain concentricity, and a substantial percentage of commercially produced and installed cables are eccentric, or bent, to a greater or lesser degree. During rapid rotation of the cable 10″, the eccentricity tends to produce whip at the end 102 of the cable, with that end tending to rotate about an axis other than its longitudinal axis. If the socket in the speedometer assembly is greater in size than the end 102 of the cable 10″, the entire cable tends to whip from a point within the casing 12′ to the end of the portion 102. If on the other hand the fitting between the end portion 102 and the socket is relatively tight so that the forwardmost end of the cable 110″ is maintained approximately concentric with the ferrule 22″, then whip still occurs but over a shorter range, tending to be concentrated in the region of the collar 38″. In either case, this whipping action tends to cause the cable 10″ repetitively to strike the forward end of the casing 12″.

Further it also has been found that as the cable 10″ is rotated at higher speeds, such as when the automobile surpasses a speed of 30 miles an hour or so, the cable 10″ tends to unwind, crawl or stretch so that the collar 38″ tends to move to the right in the view of Fig. 10 and away from the member 104. In the absence of the member 104, the whipping action of the cable 10″ will then cause the collar 38″ to strike the inner walls of the ferrule 22″ creating a high level of noise.

Hence, an important function of the member 104 and an important basis for selecting its internal diameter, is to insure that whipping action of the cable 10″ will be limited by the cable striking the inner surfaces of that member 104. Since the member 104 is non-metallic, this contact will produce much less noise than has previously been the case. Further, since the internal diameter of the member 104 is limited, the maximum amplitude of whip of the cable 10″ is correspondingly limited.

As is shown in Fig. 12, in some instances it may be desirable to interpose a sleeve 108 between the forward end of the casing 12‴ and the back face of the member 104′. When a sleeve 108 is employed, it is desirable that it be made of a resilient, sound-absorbing material such as rubber, nylon, etc. and that it have approximately the same internal diameter as the member 104′, although it has been found preferable to make its internal diameter slightly greater than the internal diameter of the member 104′. Sleeve 108 therefore serves primarily to deaden the transmission of sound originating elsewhere, with member 104 serving primarily to prevent the generation of sound by the whipping action of the cable 10″.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a torque transmitting cable assembly, a casing, a flexible cable disposed within said casing and extending beyond one end thereof, a tubular ferrule, means holding said casing against rotation relative to said ferrule, and means comprising a resilient sound-absorbing sleeve disposed within said ferrule and surrounding a portion of said cable for preventing excessive whipping of said cable, said cable extending beyond each end of said sleeve.

2. In a torque transmitting assembly, a casing, a flexible cable disposed within said casing and extending beyond one end thereof, a tubular ferrule, a resilient sound-absorbing bushing tightly and non-rotatively engaging a portion of the inner surface of said ferrule and tightly and non-rotatively engaging said casing, and a resilient sound-absorbing sleeve disposed within said ferrule and engaging said cable.

3. In a torque transmitting assembly, a casing, a flexible cable disposed within said casing and extending beyond one end thereof, a portion of the projecting end of said cable having opposing flat surfaces, a tubular ferrule, means for holding said casing against rotation relative to said ferrule, a spring clip having a pair of legs engaging said flat surfaces on said cable, and a collar rigidly mounted on said clip and said cable.

4. In a torque transmitting assembly, a casing, a flexible cable disposed within said casing and extending beyond one end thereof, a tubular ferrule having an annular flange therewithin apertured to pass said cable, a resilient sound-absorbing bushing tightly and non-rotatively engaging a portion of the inner surface of said ferrule and tightly and non-rotatively engaging said casing and proximate one face of said flange, and a resilient sound-absorbing sleeve disposed within said ferrule proximate the other face of said flange and engaging said cable.

5. In a torque transmitting assembly, a casing, a flexible cable disposed within said casing and extending beyond one end thereof, a tubular ferrule having an annular flange therewithin apertured to pass said cable, a resilient sound-absorbing bushing tightly and non-rotatively engaging a portion of the inner surface of said ferrule and tightly and non-rotatively engaging said casing and proximate one face of said flange, a resilient sound-absorbing sleeve disposed within said ferrule proximate the other face of said flange and engaging said cable, and a plastic sleeve bearing interposed said cable and said flange.

6. In a torque transmitting assembly, a casing, a flexible cabled disposed within said casing and extending beyond one end thereof, a tubular ferrule having an annular flange therewithin apertured to pass said cable, a resilient sound-absorbing bushing tightly and nonrotatively engaging a portion of the inner surface of said ferrule and tightly and non-rotatively engaging said casing and proximate one face of said flange, a resilient sound-absorbing sleeve disposed within said ferrule proximate the other face of said flange and engaging said cable, and a bearing member interposed said sleeve and other face of said flange.

7. In a torque transmitting assembly, a casing, a flexible cable disposed within said casing and extending beyond one end thereof, a portion of the projecting end of said cable having opposing flat surfaces, a tubular ferrule having an annular flange therewithin apertured to pass said cable, a resilient sound-absorbing bushing tightly and non-rotatively engaging a portion of the inner surface of said ferrule and tightly and non-rotatively engaging said casing and proximate one face of said flange, a resilient sound-absorbing sleeve disposed within said ferrule proximate the other face of said flange and engaging said cable, a spring clip having a pair of legs engaging and fastened to said flat surfaces on said cable, and a collar rigidly mounted on said clip and said cable and abutting said sleeve.

8. In a torque transmitting assembly, a circular cylindrical flexible cable, a spring clip having a generally tubular end portion with a longitudinal slot therein, and means circumferential of said tubular end portion and engaging said slot for retaining said spring clip on said cable.

9. In a torque transmitting assembly, a flexible cable, a spring clip having a generally tubular end portion with a longitudinal slot therein, said tubular end portion being disposed upon one end of said cable, and a collar surrounding said tubular end portion and having a portion disposed within said slot and engaging said cable.

10. In a torque transmitting assembly, a circular cylindrical flexible cable, a spring clip having a generally tubular end portion with a pair of diametrically opposed longitudinal slots therein, said tubular end portion being disposed upon one end of said cable, a collar surrounding and tightly engaging said tubular end portion, and diametrically opposed longitudinal flanges on the inner surface of said collar disposed within said slots and engaging opposite sides of said cable.

11. In a torque transmitting assembly, a flexible cable, a spring clip having two spaced-apart legs embracing one end of said cable, and a collar clamping said spring clip to said cable.

12. In a torque transmitting assembly, a flexible cable, a spring clip having two spaced-apart legs embracing one end of said cable, and a collar clamping said spring clip to said cable, said collar having portions engaging said legs and portions engaging said cable.

13. In a torque transmitting assembly, a casing, a flexible wound-wire cable disposed within said casing and extending beyond one end thereof, a tubular ferrule, means holding said casing against rotation relative to said ferrule, a sleeve of non-metallic material disposed and secured within said ferrule and surrounding a portion of said wound-wire cable, said cable extending beyond each end of said sleeve and being rotatable relative to said sleeve, a metallic member secured to said cable and engageable with a face of said sleeve and separable therefrom when said cable elongates during use.

14. In a torque transmitting assembly, a casing, a flexible wound-wire cable disposed within said casing and extending beyond one end thereof, a tubular ferrule, means holding said casing against rotation relative to said ferrule, and a sleeve of non-metallic material disposed and secured within said ferrule and surrounding a portion of said cable, said cable extending beyond each end of said sleeve, said sleeve guiding and engaging portions of said cable during rotation of said wound-wire cable relative to said casing and preventing excessive whipping of said cable.

15. If a torque transmitting assembly, a casing, a flexible wound-wire cable disposed within said casing and extending beyond one end thereof, a tubular ferrule, means holding said casing against rotation relative to said ferrule, a sleeve of non-metallic material disposed within said ferrule and surrounding a portion of said cable, said cable extending beyond each end of said sleeve, said sleeve being coaxial with said ferrule and with said portion of said cable and serving to maintain said portion of said cable coaxial with said ferrule during rotation of said cable relative to said ferrule, and means secured upon said cable for preventing movement of said cable relative to said ferrule in one direction along the longitudinal axis of said cable while permitting movement of said cable relative to said ferrule in the opposite direction along the longitudinal axis of said cable.

16. In a torque transmitting assembly, a casing, a flexible cable disposed within said casing and extending beyond each end thereof, a tubular ferrule at each end of said casing, means fixing said casing against rotation relative to said ferrules, and a sleeve in each of said ferrules coaxially aligned with its individual ferrule and an individual portion of said cable.

17. In a torque transmitting assembly, a tubular ferrule, a casing secured to said ferrule, a flexible wound-wire cable disposed within said casing and extending beyond one end thereof and into said ferrule, a centrally apertured nonmetallic member within said ferrule and surrounding and engageable with said wound-wire cable, and means secured upon said wound-wire cable and engageable with said member for preventing movement of said cable relative to said member in one direction along the longitudinal axis of said cable while permitting movement of said cable relative to said ferrule in the opposite direction along the longitudinal axis of said cable.

18. In a torque transmitting assembly, a tubular ferrule, a casing secured to said ferrule, a centrally apertured, cylindrical, nonmetallic member secured within said ferrule coaxially with said ferrule, a flexible wound-wire cable disposed within said casing and extending beyond one end thereof and through the central aperture in said member and engageable with surfaces of said member, and collar means secured to said cable and engageable with one face of said member for preventing movement of said cable relative to said member in one direction along the longitudinal axis of said cable while permitting movement of said cable relative to said ferrule in the opposite direction along the longitudinal axis of said cable.

19. In a torque transmitting assembly, a tubular ferrule, a casing secured to said ferrule, a centrally apertured, cylindrical, nonmetallic member secured within said ferrule coaxially with said ferrule, a flexible cable disposed within said casing and extending beyond one end thereof and through the central aperture in said member, and collar means secured to said cable and engageable with one face of said member for preventing movement of said cable relative to said member in one direction along the longitudinal axis of said cable while permitting movement of said cable relative to said ferrule in the opposite direction along the longitudinal axis of said cable, said member being tightly fitted within said ferrule, the inner diameter of said member being substantially greater than the diameter of said cable, said collar means being substantially smaller than the internal diameter of said ferrule.

20. In a torque transmitting assembly, a tubular ferrule, a casing secured to said ferrule, a flexible cable rotatably disposed within said casing and extending beyond one end thereof and into said ferrule, a collar secured to said cable within said ferrule, said collar being substantially smaller than the internal diameter of said ferrule, and means for preventing said collar from striking said ferrule during whipping of said cable comprising a nonmetallic member secured within said ferrule and loosely engaging said cable.

21. In a torque transmitting assembly, a tubular ferrule, a flexible metallic casing inserted within one end of said ferrule, means securing said casing to said ferrule, a nonmetallic cylindrical, centrally apertured member tightly and nonrotatively fitted within said ferrule adjacent the end of said casing, a flexible cable rotatably disposed within said casing and extending beyond said end of said casing and through the aperture in said member and therebeyond, the internal diameters of said casing and of said member being approximately the same and both being larger than the diameter of said cable, and a metallic collar secured to said cable within said ferrule and having a face engageable with a face of said member for preventing movement of said cable relative to said ferrule in one direction along the longitudinal axis of said cable while permitting movement of said cable relative to said ferrule in the opposite direction along the longitudinal axis of said cable.

22. In a torque transmitting assembly, a tubular ferrule, a casing secured to said ferrule, a flexible cable disposed within said casing and extending beyond one end thereof and into said ferrule, a centrally apertured, cylindrical member nonrotatively secured within said ferrule, a portion of said cable lying within the aperture in said member, and a sleeve of plastic material within said ferrule and interposed the end of said casing and said member.

References Cited in the file of this patent

UNITED STATES PATENTS

| | | |
|---|---|---|
| 1,324,787 | Berge | Dec. 16, 1919 |
| 1,437,493 | Cawse | Dec. 5, 1922 |
| 1,848,061 | Helgeby | Mar. 1, 1932 |
| 2,039,378 | Anderson | May 5, 1936 |
| 2,111,713 | Watson | Mar. 22, 1938 |
| 2,388,129 | Eisenbeis | Oct. 30, 1945 |
| 2,586,360 | Mall | Feb. 19, 1952 |
| 2,600,353 | Wightman | June 10, 1952 |
| 2,652,293 | Phillips | Sept. 15, 1953 |
| 2,782,020 | McCandless | Feb. 19, 1957 |